(12) United States Patent
Tsukamoto et al.

(10) Patent No.: US 10,442,437 B2
(45) Date of Patent: Oct. 15, 2019

(54) CONTROL DEVICE OF VEHICLE

(71) Applicant: TOYOTA JIDOSHA KABUSHIKI KAISHA, Toyota-shi, Aichi (JP)

(72) Inventors: Norihiro Tsukamoto, Toyota (JP); Tomohiro Asami, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 15/889,478

(22) Filed: Feb. 6, 2018

(65) Prior Publication Data
US 2018/0229734 A1  Aug. 16, 2018

(30) Foreign Application Priority Data
Feb. 16, 2017 (JP) ................................ 2017-027376

(51) Int. Cl.
*B60W 30/19* (2012.01)
*B60W 10/06* (2006.01)
(Continued)

(52) U.S. Cl.
CPC ............ *B60W 30/19* (2013.01); *B60W 10/06* (2013.01); *B60W 10/11* (2013.01);
(Continued)

(58) Field of Classification Search
None
See application file for complete search history.

(56) References Cited

U.S. PATENT DOCUMENTS 5,785,627 A * 7/1998 Uno ...................... B60W 10/06
477/109
7,955,215 B2 * 6/2011 Shibata .................. B60K 6/445
477/3
(Continued)

FOREIGN PATENT DOCUMENTS

JP 2006-112247 A 4/2006
WO 2014/020685 A1 2/2014

*Primary Examiner* — Dirk Wright
(74) *Attorney, Agent, or Firm* — Oliff PLC

(57) ABSTRACT

A control device of a vehicle including a multi-speed transmission having gear positions switched by executing release of a release-side engagement device out of a plurality of engagement devices and engagement of an engagement-side engagement device out of the plurality of engagement devices, and an engine of which a power is transmitted through the multi-speed transmission to drive wheels, the control device performing a shift of the multi-speed transmission by using a predefined shift model for determining control operation amounts of a torque at an input rotating member of the multi-speed transmission, a torque capacity of the release-side engagement device, and a torque capacity of the engagement-side engagement device, the control operation amounts achieving shift target values that are a target value of a torque at an output rotating member of the multi-speed transmission and a target value of angular acceleration of the input rotating member of the multi-speed transmission, the control device comprising: a condition setting portion setting a condition necessary for determining the control operation amounts using the shift model such that during a downshift performed during deceleration running associated with accelerator-off state, an output torque of the engine is raised with the release-side engagement device released so as to increase a rotation speed of the input rotating member of the multi-speed transmission toward a synchronous rotation speed after the downshift and such that (Continued)

the engagement-side engagement device is then engaged; and a shift target value setting portion setting the target value of the torque at the output rotating member of the multi-speed transmission during the downshift such that the torque at the output rotating member of the multi-speed transmission is increased from a value of the torque at the output rotating member before the downshift within a range of zero or less, and when a rotation speed of the input rotating member of the multi-speed transmission approaches the synchronous rotation speed after the downshift, the target value is reduced toward a torque at the output rotating member after the downshift.

16 Claims, 5 Drawing Sheets

(51) Int. Cl.
*B60W 10/11* (2012.01)
*F16H 61/04* (2006.01)
*F16H 61/06* (2006.01)
*F16H 63/50* (2006.01)

(52) U.S. Cl.
CPC ....... *F16H 61/0403* (2013.01); *F16H 61/061* (2013.01); *F16H 63/502* (2013.01); *B60W 2510/0652* (2013.01); *B60W 2510/10* (2013.01); *B60W 2710/021* (2013.01); *B60W 2710/0627* (2013.01); *B60W 2710/0666* (2013.01); *B60W 2710/105* (2013.01); *B60W 2710/1011* (2013.01); *F16H 2306/48* (2013.01)

(56) References Cited

U.S. PATENT DOCUMENTS

| | | | |
|---|---|---|---|
| 9,308,908 B2* | 4/2016 | Chen | F16H 61/0437 |
| 10,227,942 B2* | 3/2019 | Bulgrien | B60W 30/1882 |
| 2015/0184740 A1 | 7/2015 | Masunaga et al. | |

* cited by examiner

|  | C1 | C2 | C3 | C4 | B1 | B2 |
|---|---|---|---|---|---|---|
| 1st | O |  |  |  |  | O |
| 2nd | O |  |  |  | O |  |
| 3rd | O |  | O |  |  |  |
| 4th | O |  |  | O |  |  |
| 5th | O | O |  |  |  |  |
| 6th |  | O |  | O |  |  |
| 7th |  | O | O |  |  |  |
| 8th |  | O |  |  | O |  |
| Rev |  |  | O |  |  | O |

O: ENGAGEMENT   BLANK: RELEASE

CONTROL DEVICE OF VEHICLE

This application claims priority from Japanese Patent Application No. 2017-027376 filed on Feb. 16, 2017, the disclosure of which is herein incorporated by reference in its entirety.

BACKGROUND OF THE INVENTION

1. Field of the Invention

The present invention relates to a control device of a vehicle performing a shift of a multi-speed transmission.

2. Description of the Related Art

In a vehicle including a multi-speed transmission having gear positions switched by controlling release of a release-side engagement device out of a plurality of engagement devices and engagement of an engagement-side engagement device out of the plurality of engagement devices, and an engine having a power transmitted through the multi-speed transmission to drive wheels, a control device of the vehicle is well known that performs a shift of the multi-speed transmission by using a predefined shift model for determining control operation amounts achieving shift target values. For example, this corresponds to the shift control device of a vehicle described in Patent Document 1. It is disclosed in Patent Document 1 that a shift of the automatic transmission is performed according to a shift model for calculating the control operation amounts based on the shift target values by using a motion equation of an automatic transmission including target values of a transmission output torque and an input shaft angular acceleration as the shift target values as well as a transmission input torque, a torque capacity of the engagement-side engagement device, and a torque capacity of the release-side engagement device as the control operation amounts, and a relationship representative of a torque sharing ratio of transmission torques assigned to the engagement-side engagement device and the release-side engagement device at the time of the shift.

PRIOR ART DOCUMENT

Patent Document

Patent Document 1: WO 2014/020685A1

At the time of a downshift performed during deceleration running associated with accelerator-off, it is conceivable that by raising an output torque of the engine (also referred to as an engine torque) with the release-side engagement device released, a rotation speed of an input rotating member of the multi-speed transmission is increased toward a synchronous rotation speed after the downshift to allow the shift to proceed before the engagement-side engagement device is engaged. On the other hand, the torque at the input rotating member of the multi-speed transmission determined by using the shift model is achieved by controlling the engine torque. If a fuel cut control is provided in the engine during decelerating running associated with accelerator-off, the engine torque is determined by a rotational resistance etc. of the engine and it is difficult to control the engine torque to a desired value. Cancelation of the fuel cut control makes the engine torque controllable to a desired value. When the downshift as described above is performed by using a shift model, a required value of the engine torque determined using the shift model is increased from a region in which the engine torque is difficult to be controlled into a region in which the engine torque is controllable in some cases. In such a case, since the actual engine torque is increased through the control from when the required value of the engine torque enters the controllable region of the engine torque, a torque amount exclusively contributing to the progress of the down shift is only an amount of torque increased while the required value of the engine torque is within the controllable region of the engine torque. Therefore, in the case of the downshift as described above, the downshift may hardly proceed due to an insufficient increment of the actual engine torque.

SUMMARY OF THE INVENTION

The present invention was conceived in view of the situations and it is therefore an object of the present invention to provide a control device of a vehicle capable of suppressing stagnation of a shift due to an insufficiency increment of engine torque when a downshift during deceleration running associated with accelerator-off is performed by using a shift model.

The object indicated above is achieved according to a first aspect of the present invention, which provides a control device of a vehicle including a multi-speed transmission having gear positions switched by executing release of a release-side engagement device out of a plurality of engagement devices and engagement of an engagement-side engagement device out of the plurality of engagement devices, and an engine of which a power is transmitted through the multi-speed transmission to drive wheels, the control device performing a shift of the multi-speed transmission by using a predefined shift model for determining control operation amounts of a torque at an input rotating member of the multi-speed transmission, a torque capacity of the release-side engagement device, and a torque capacity of the engagement-side engagement device, the control operation amounts achieving shift target values that are a target value of a torque at an output rotating member of the multi-speed transmission and a target value of angular acceleration of the input rotating member of the multi-speed transmission, the control device comprising: a condition setting portion setting a condition necessary for determining the control operation amounts using the shift model such that during a downshift performed during deceleration running associated with accelerator-off state, an output torque of the engine is raised with the release-side engagement device released so as to increase a rotation speed of the input rotating member of the multi-speed transmission toward a synchronous rotation speed after the downshift and such that the engagement-side engagement device is then engaged; and a shift target value setting portion setting the target value of the torque at the output rotating member of the multi-speed transmission during the downshift such that the torque at the output rotating member of the multi-speed transmission is increased from a value of the torque at the output rotating member before the downshift within a range of zero or less, and when a rotation speed of the input rotating member of the multi-speed transmission approaches the synchronous rotation speed after the downshift, the target value is reduced toward a torque at the output rotating member after the downshift.

A second aspect of the present invention provides the control device of a vehicle recited in the first aspect of the present invention, wherein the shift target value setting portion increases the target value of the torque at the output rotating member of the multi-speed transmission in a period from a start of a shift control to a start of an inertia phase in the downshift.

A third aspect of the present invention provides the control device of a vehicle recited in the first or second aspect of the present invention, further comprising an engine control portion providing a fuel cut control of the engine during the deceleration running associated with the accelerator-off state, wherein the shift target value setting portion increases the target value of the torque at the output rotating member of the multi-speed transmission toward a value larger than a value acquired by multiplying a torque at the input rotating member of the multi-speed transmission corresponding to a minimum torque of the output torque of the engine at the time of cancelation of the fuel cut control by a gear ratio of the multi-speed speed transmission after the downshift.

A fourth aspect of the present invention provides the control device of a vehicle recited in any one of the first to third aspects of the present invention, further comprising a control operation amount calculating portion calculating the control operation amounts in accordance with the shift model for determining the control operation amounts achieving the shift target values, by using a motion equation of the multi-speed transmission including the shift target values and the control operation amounts as well as the condition necessary for determining the control operation amounts with the shift model.

According to the first aspect of the invention, during the downshift during deceleration running associated with accelerator-off state performed by using the shift model, the target value of the torque at the output rotating member of the multi-speed transmission is set such that after being increased within the range of zero or less, the target value is reduced toward the torque at the output rotating member after downshift and, therefore, the required value of the engine torque is increased as the target value of the torque at the output rotating member of the multi-speed transmission is once increased, so that an increment of the engine torque is easily ensured when the engine torque is raised with the release-side engagement device released. Thus, when the downshift during deceleration running associated with accelerator-off is performed by using the shift model, the shift can be restrained from stagnating due to the shortage of the increment of the engine torque.

According to the second aspect of the invention, since the target value of the torque at the output rotating member of the multi-speed transmission is increased in the period from the start of the shift control to the start of the inertia phase in the downshift, the increment of the engine torque in the inertia phase is easily ensured and the stagnation of the shift can appropriately be suppressed.

According to the third aspect of the invention, since the target value of the torque at the output rotating member of the multi-speed transmission is increased toward the value larger than the value acquired by multiplying the torque at the input rotating member of the multi-speed transmission corresponding to the minimum torque of the engine torque at the time of cancelation of the fuel cut control by the gear ratio of the multi-speed transmission after the downshift, the increment of the engine torque is more easily ensured when the engine torque is raised with the release-side engagement device released.

According to the fourth aspect of the invention, since the control operation amounts are calculated according to the shift model for determining the control operation amounts achieving the shift target values by using the motion equation of the multi-speed transmission including the shift target values and the control operation amounts as well as the condition necessary for determining the control operation amounts with the shift model, the control operation amounts can appropriately be calculated when the downshift is performed during deceleration running associated with accelerator-off.

DESCRIPTION OF THE PREFERRED EMBODIMENTS

In an embodiment of the present invention, the multi-speed transmission is an automatic transmission in which a plurality of gear positions different in gear ratio is selectively established. The automatic transmission is, for example, a known planetary gear type automatic transmission, or a synchronous meshing type parallel two-shaft automatic transmission known as a DCT (Dual Clutch Transmission) that is a type of automatic transmission including two systems of input shafts each connected to engagement devices respectively and further respectively connected to gears corresponding to the even positions and the odd positions. In the case of DCT, the plurality of engagement devices corresponds to the engagement devices respectively connected to the input shafts of the two systems.

The engine is an internal combustion engine such as a gasoline engine or a diesel engine combusting fuel to generate power, for example. Although the vehicle may include at least the engine as a power source, another motor such as an electric motor may also be included along with the engine.

An example of the present invention will now be described in detail with reference to the drawings.

Example

Figure 1:
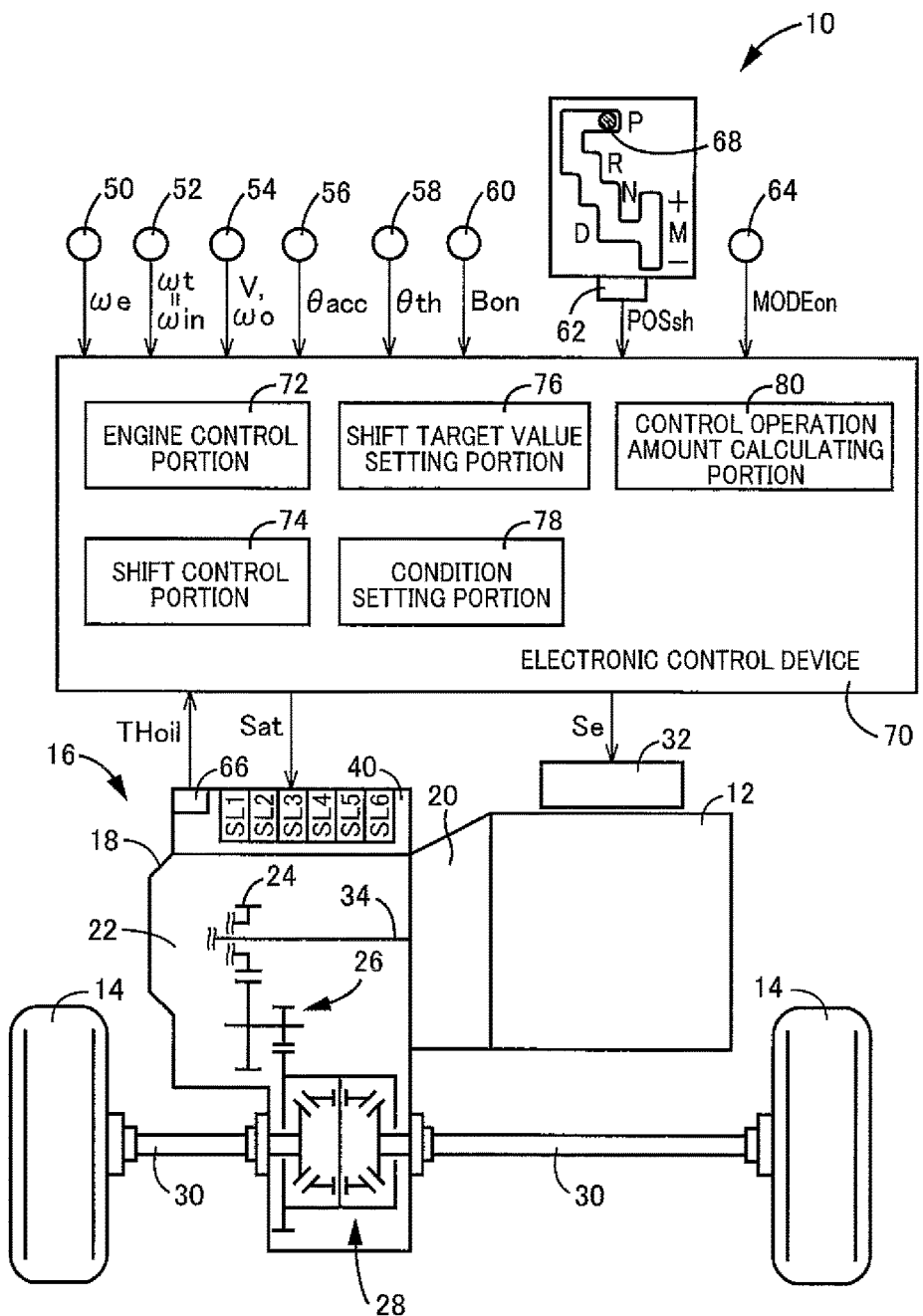
FIG. 1 is a diagram for explaining a general configuration of a vehicle to which the present invention is applied and is a diagram for explaining main portions of a control function and a control system for various controls in the vehicle.

FIG. 1 is a diagram for explaining a general configuration of a vehicle 10 to which the present invention is applied and is a diagram for explaining main portions of a control function and a control system for various controls in the vehicle 10. In FIG. 1, the vehicle 10 includes an engine 12, drive wheels 14, and a power transmission device 16 disposed in a power transmission path between the engine 12 and the drive wheels 14. The power transmission device 16 includes, in a case 18 acting as a non-rotating member attached to a vehicle body, a torque converter 20, an automatic transmission 22, a reduction gear mechanism 26 coupled to a transmission output gear 24 that is an output rotating member of the automatic transmission 22, a differential gear 28 coupled to the reduction gear mechanism 26, etc. The power transmission device 16 also includes a pair of drive shafts 30 etc. coupled to the differential gear 28. In the power transmission device 16, the power (synonymous with torque and force if not particularly distinguished) output from the engine 12 is transmitted sequentially through the torque converter 20, the automatic transmission 22, the reduction gear mechanism 26, the differential gear 28, the drive shaft 30, etc. to the driving wheels 14.

The engine 12 is a drive force source of the vehicle 10 and includes an engine control device 32 having various devices necessary for an output control of the engine 12, such as an electronic throttle device, a fuel injection device, and an ignition device. In the engine 12, an output torque of the engine 12 (i.e., an engine torque Te) is controlled through control of the engine control device 32 depending on an accelerator opening degree θacc corresponding to a drive request amount from a driver to the vehicle 10 by an electronic control device 70 described later.

Figures 2, 3:
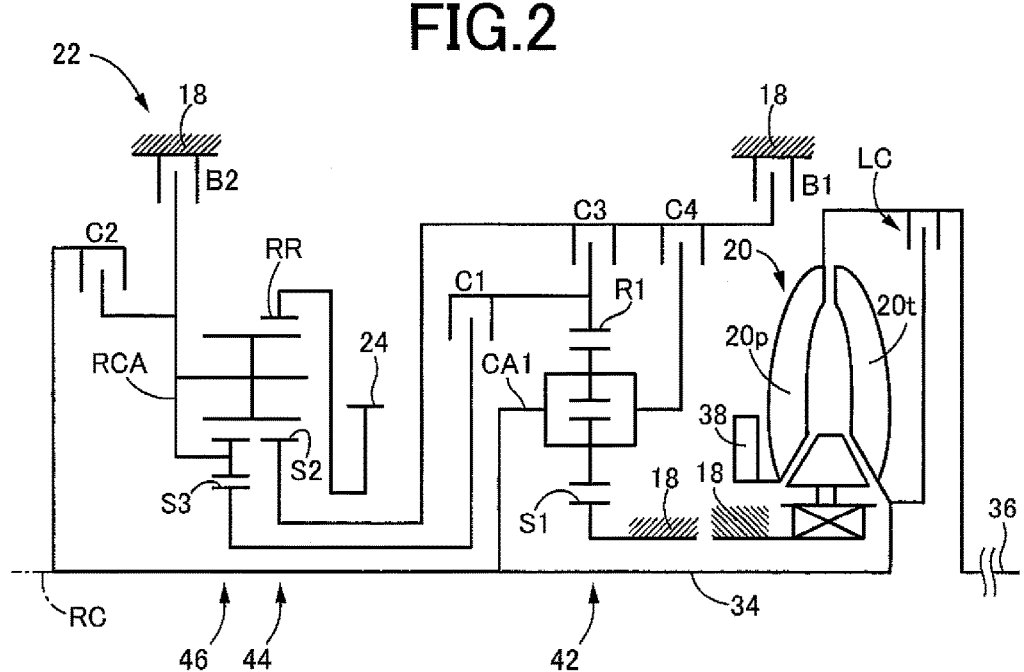
FIG. 2 is a schematic for explaining an example of a torque converter and an automatic transmission.
FIG. 3 is an operation chart for explaining a relationship between a shift operation of the automatic transmission and a combination of operations of engagement devices used therefor.

FIG. 2 is a schematic for explaining an example of the torque converter 20 and the automatic transmission 22. The torque converter 20, the automatic transmission 22, etc. are configured substantially symmetrically with respect to an axial center RC of a transmission input shaft 34 that is an input rotating member of the automatic transmission 22 and have lower halves from the axial center RC not shown in FIG. 2.

In FIG. 2, the torque converter 20 is disposed in a power transmission path between the engine 12 and the automatic transmission 22 and is a fluid transmission device including a pump impeller $20p$ and a turbine impeller $20t$. The pump impeller $20p$ is an input rotating member of the torque converter 20 and is coupled to a crankshaft 36 of the engine 12. The turbine impeller $20t$ is an output rotating member of the torque converter 20 and is coupled to a transmission input shaft 34. The transmission input shaft 34 also serves as a turbine shaft. The power transmission device 16 also includes a known lock-up clutch LC as a direct-coupling clutch coupling the pump impeller $20p$ and the turbine impeller $20t$ (i.e., coupling the input/output rotating members of the torque converter 20). The power transmission device 16 also includes a mechanical oil pump 38 coupled to the pump impeller $20p$. The oil pump 38 is rotationally driven by the engine 12 to discharge hydraulic fluid used for a shift control of the automatic transmission 22, used for a switching control of an operation state of the lock-up clutch LC, and for supplying lubrication oil to portions of the power transmission device 16. Therefore, the hydraulic fluid pumped up by the oil pump 38 is supplied as a source pressure of a hydraulic control circuit 40 (see FIG. 1) included in the vehicle 10.

The automatic transmission 22 is a multi-speed automatic transmission constituting a portion of the power transmission path between the engine 12 and the drive wheels 14. The automatic transmission 22 is a known planetary gear type automatic transmission including a plurality of planetary gear devices, i.e. a first planetary gear device 42, a second planetary gear device 44, and a third planetary gear device 46, as well as a plurality of engagement devices, i.e., a first clutch C1, a second clutch C2, a third clutch C3, a fourth clutch C4, a first brake B1, and a second brake B2 (hereinafter simply referred to as engagement devices CB if not particularly distinguished).

The engagement devices CB are hydraulic friction engagement devices made up of multiplate or single-plate type clutches and brakes pressed by hydraulic actuators, band brakes fastened by hydraulic actuators, etc. The engagement devices CB have respective torque capacities (clutch torques) Tcb (i.e., clutch torques Tc1, Tc2, Tc3, Tc4, Tb1, Tb2) changed in accordance with regulated hydraulic pressures (clutch pressures) Pcb (i.e., clutch pressures Pc1, Pc2, Pc3, Pc4, Pb1, Pb2) output respectively from solenoid valves SL1 to SL6 etc. in the hydraulic control circuit 40, so that respective operation states (states such as engagement and release) are switched. To transmit a torque between the transmission input shaft 34 and the transmission output gear 24 without slipping the engagement devices CB (i.e., without generating a differential rotation speed in the engagement devices CB), each of the engagement devices CB needs to have the clutch torque Tcb capable of providing a transmission torque amount that must be assigned thereto (i.e., a shared torque of the engagement device CB) with respect to the torque. However, at the clutch torque Tcb capable of providing the transmission torque amount, the transmission torque does not increase even if the clutch torque Tcb is increased. In this example, the clutch torque Tcb and the clutch pressure Pcb may synonymously be used for convenience.

In the automatic transmission 22, rotating elements (a first sun gear S1, a first carrier CA1, a first ring gear R1, a second sun gear S2, a third sun gear S3, a carrier RCA, a ring gear RR) of the plurality of the planetary gear devices are partly coupled to each other, or coupled to the transmission input shaft 34, the case 18, or the transmission output gear 24, directly or indirectly (or selectively) via the engagement devices CB. In the second planetary gear device 44 and the third planetary gear device 46, the carriers are made up of the common carrier RCA and the ring gears are made up of the common ring gear RR such that a so-called Ravigneaux type is achieved.

The automatic transmission 22 has a plurality of gear positions (gear shift positions) different in gear ratio (speed change ratio) γ (=AT input rotation speed ωin/AT output rotation speed ωo) selectively established by selective engagement of the engagement devices CB. For example, as shown in an engagement operation table of FIG. 3, the automatic transmission 22 has eight forward gear positions from a first speed gear position "1st" to an eighth speed gear position "8th" and a reverse gear position "Rev" such that the gear positions are selectively established. When the engagement devices CB are all released, the automatic transmission 22 is brought into a neutral state in which no gear position is established (i.e., a neutral state in which power transmission is interrupted). The gear ratio γ is the highest at the first speed gear position "1st" and decreases toward the higher vehicle speed side (the eighth speed gear position "8th" side). The engagement operation table of FIG. 3 represents the relationship between the gear positions established in the automatic transmission 22 and the operation states of the engagement devices CB, and "O" and a blank indicate engagement and release of the engagement devices CB, respectively. The AT input rotation speed ωin is rotation speed (angular speed) of the transmission input shaft 34 and the AT output rotation speed ωo is rotation speed of the transmission output gear 24. The gear ratio γ of the automatic transmission 22 corresponding to each of the gear positions is appropriately defined by gear ratios (=the number of teeth of the sun gear/the number of teeth of the ring gear) ρ1, ρ2, and ρ3 of the first planetary gear device 42, the second planetary gear device 44, and the third planetary gear device 46.

In the automatic transmission 22, the gear position to be established is switched (i.e. each of the gear positions is selectively achieved) by controlling the release of a release-side engagement device out of the engagement devices CB and the engagement of an engagement-side engagement device out of the engagement devices CB by the electronic control device 70 described later in accordance with a driver's accelerator operation, a vehicle speed V, etc. At the time of a shift of the automatic transmission 22, the electronic control device 70 performs a so-called clutch-to-clutch shift making a change in engagement of the engagement devices involved in the shift of the automatic transmission 22 (i.e., switching the engagement and release of the engagement devices CB), for example. The release-side engagement device is an engagement device to be released out of the engagement devices CB changed in engagement at the time of the shift, and the engagement-side engagement device is an engagement device to be engaged out of the engagement devices CB changed in engagement at the time of the shift. For example, in the downshift from the second speed gear position "2nd" to the first speed gear position "1st" (represented as 2→1 downshift), as shown in the engagement operation table of FIG. 3, the first brake B1 serving as the release-side engagement device is released and the second brake B2 serving as the engagement-side engagement device is engaged. In this case, a release transition hydraulic pressure of the first brake B1 and an engagement transition hydraulic pressure of the second brake B2 are subjected to pressure-regulation control.

Returning to FIG. 1, the vehicle 10 includes the electronic control device 70 including a control device of the vehicle 10 related to the shift control of the automatic transmission 22, for example. The electronic control device 70 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 70 provides the output control of the engine 12, the shift control of the automatic transmission 22, etc., and is configured separately for the engine output control, the hydraulic control (the shift control), etc., as needed.

The electronic control device 70 is supplied with various signals (e.g., an engine rotation speed ωe that is rotation speed of the engine 12, the AT input rotation speed ωin that is also rotation speed of the turbine shaft (i.e., a turbine rotation speed ωt), the AT output rotation speed ωo corresponding to the vehicle speed V, the accelerator opening degree θacc that is an operation amount of an accelerator pedal, a throttle valve opening degree θth that is an opening degree of a throttle valve included in the electronic throttle device, a brake-on Bon representative of a brake operation state when a driver operates a brake operation member for operating a wheel brake, an operation position POSsh of a shift lever 68 serving as a shift operation member included in the vehicle 10, a mode-on MODEon representative of an operation of a driving mode selecting switch 64, and a hydraulic fluid temperature THoil that is a temperature of hydraulic fluid in the hydraulic control circuit 40) based on detection values from various sensors etc. included in the vehicle 10 (e.g., an engine rotation speed sensor 50, an input rotation speed sensor 52, an output rotation speed sensor 54, an accelerator opening degree sensor 56, a throttle valve opening degree sensor 58, a brake switch 60, a shift position sensor 62, the driving mode selecting switch 64, and an oil temperature sensor 66). The electronic control device 70 supplies various devices included in the vehicle 10 (e.g., the engine control device 32 and the hydraulic control circuit 40) with various command signals (e.g., an engine control command signal Se and a hydraulic control command signal Sat). This hydraulic control command signal Sat is a command signal (instruction pressure) for driving the solenoid valves SL1 to SL6 regulating the clutch pressures Pcb supplied to the hydraulic actuators of the engagement devices CB and is output to the hydraulic control circuit 40.

The operation position POSsh of the shift lever 68 includes, for example, P-, R-, N-, D-, and M-operation positions. The P-operation position is a parking operation position for selecting a parking position of the automatic transmission 22 at which the automatic transmission 22 is put into the neutral state while the rotation of the transmission output gear 24 is mechanically blocked (locked). The R-operation position is a backward-running operation position for selecting backward-running position of the automatic transmission 22 allowing the vehicle 10 to run backward. The N-operation position is a neutral operation position for selecting a neutral position of the automatic transmission 22 at which the automatic transmission 22 is put into the neutral state. The D-operation position is a forward-running operation position for selecting a forward-running position of the automatic transmission 22 at which an automatic shift control is provided among all the forward running gear positions of the automatic transmission 22 to allow the vehicle to run forward. The M-operation position is a manual shift operation position enabling a manual shift for switching the gear position of the automatic transmission 22 according to a driver's operation. This M-operation position includes an upshift operation position "+" for upshifting each time the shift lever 68 is operated, and a downshift operation position "−" for downshifting each time the shift lever 68 is operated. When the operation position POSsh is at the D-operation position, an automatic shift mode is established for automatically shifting the automatic transmission 22 according to a known shift map. When the operation position POSsh is at the M-operation position, a manual shift mode is established for allowing the driver to shift the automatic transmission 22 in accordance with a shift operation.

The driving mode selecting switch 64 is an operation member enabling the driver to select vehicle running in a desired driving mode. The driving mode includes, for example, a predefined normal mode for running such that the driver can drive in a favorable fuel consumption state while an engine performance is achieved, a predefined sport mode (or power mode) for running such that the driver can drive in a state in which the engine performance is prioritized over fuel efficiency in comparison with the normal mode, a predefined eco-mode for running such that the driver can drive in a state in which the fuel efficiency is prioritized over the engine performance in comparison with the normal mode.

To implement various controls in the vehicle 10, the electronic control device 70 includes an engine control means, i.e., an engine control portion 72, and a shift control means, i.e., a shift control portion 74.

The engine control portion 72 controls the engine 12 such that a required value of the engine torque Te (hereinafter referred to as a required engine torque Tedem) is acquired. For example, the engine control portion 72 applies the accelerator opening degree θacc and the vehicle speed V (synonymous with the AT output rotation speed ωo etc.) to a relationship (e.g., a drive torque map) obtained empirically or through design and stored in advance (i.e., predefined) to calculate a required drive torque Tdem. Taking the gear ratio γ of the automatic transmission 22 into consideration, the engine control portion 72 outputs to the engine control device 32 the engine control command signal Se for acquiring the engine torque Te at which the required drive torque Tdem is achieved.

For example, during inertia running (also referred to as coasting) that is a deceleration running associated with accelerator-off, the engine control portion 72 outputs to the engine control device 32 the engine control command signal Se for performing a fuel cut (also referred to as F/C) etc. for stopping a fuel supply to the engine 12 and thereby provides a fuel cut control to stop the operation of the engine 12. The stop of the engine 12 in this case is the stop of operation of the engine 12 and is not necessarily identical to the stop of rotation of the engine 12.

The shift control portion 74 provides the shift control of the automatic transmission 22. For example, when the operation position POSsh is the D-operation position, the shift control portion 74 establishes the automatic shift mode, and makes determination on a shift of the automatic transmission 22 by using a predetermined relationship (e.g., a shift map) and outputs to the hydraulic control circuit 40 the hydraulic control command signal Sat for switching the operation state of the engagement devices CB so as to automatically switch the gear position of the automatic transmission 22 as needed. On the other hand, when the operation position POSsh is the M-operation position, the shift control portion 74 establishes the manual shift mode, and outputs to the hydraulic control circuit 40 the hydraulic control command signal Sat for switching the operation state of the engagement devices CB so as to switch the gear position of the automatic transmission 22 in accordance with the shift operation of the shift lever 68 by the driver without depending on the shift map.

The shift map is a predetermined relationship having shift lines (upshift and downshift lines) for determining the shift of the automatic transmission 22 on two-dimensional coordinates having the AT output rotation speed ωo (in this case, synonymous with the vehicle speed V etc.) and the accelerator opening degree θacc (in this case, synonymous with the required drive torque Tdem, the throttle valve opening degree θth, etc.) as variables. The hydraulic control command signal Sat is a release-side instruction pressure for acquiring the clutch torque Tcb of the release-side engagement device (also referred to as a release-side clutch torque Tcbdrn) at the time of the shift and an engagement-side instruction pressure for acquiring the clutch torque Tcb of the engagement-side engagement device (also referred to as an engagement-side clutch torque Tcbapl) at the time of the shift, for example.

The shift control portion 74 performs the shift of the automatic transmission 22 by using a predefined shift model for determining control operation amounts achieving shift target values. The shift target values are target values of items (e.g., a shift time, a drive force) defining a form of change desired to be achieved at the time of the shift. The item capable of expressing the shift time is, for example, a time derivative, i.e., a time change rate, of the AT input rotation speed ωin or, in other words, an angular acceleration defined as a speed change amount of the transmission input shaft 34 (hereinafter referred to as an input shaft angular acceleration dωin/dt). The item capable of expressing the drive force is, for example, a torque at the transmission output gear 24 (hereinafter referred to as an AT output torque To). In this example, the shift target values are set as a target value of the input shaft angular acceleration dωin/dt (hereinafter referred to as a target input shaft angular acceleration dωintgt/dt) and a target value of the AT output torque To (hereinafter referred to as a target AT output torque Totgt). The control operation amounts are items (such as the engine torque Te and the clutch torque Tcb) operated for a control object. In this example, the control operation amounts are set as the torque at the transmission input shaft 34 (hereinafter referred to as an AT input torque Tin (=turbine torque Tt)), the release-side clutch torque Tcbdrn, and the engagement-side clutch torque Tcbapl.

A motion equation during the shift of the automatic transmission 22 is expressed by following Equations (1) and (2). Equations (1) and (2) are gear train motion equations of the automatic transmission 22 including the shift target values and the control operation amounts and acquired by formulating a relationship of the shift target values and the control operation amounts. Equations (1) and (2) are derived from respective motion equations of the mutually-connected rotating elements constituting the automatic transmission 22 and relational expressions in the planetary gear devices 42, 44, 46 constituting the automatic transmission 22, respectively. The respective motion equations of the rotating elements are motion equations defining with torque at the rotating elements in terms of respective torque acting on each of the three members (the sun gear, the carrier, and the ring gear) of the planetary gear devices 42, 44, 46 and member(s) involved with the respective rotating elements out of the members on both sides of the engagement devices CB, and the torque is represented by the product of the inertia and the angular acceleration at the rotating elements or the member. The relational expressions in the planetary gear devices 42, 44, 46 are relational expressions respectively defining a relationship of torque and a relationship of angular accelerations in the three members of the planetary gear devices 42, 44, 46 using the gear ratios ρ1, ρ2, ρ3 of the planetary gear devices 42, 44, 46. In Equations (1) and (2), an angular acceleration dω/dt is indicated by the angular velocity ω with a dot superposed thereon. It is noted that dωo/dt is a temporal change rate of the AT output rotation speed ωo and represents an angular acceleration (output gear angular acceleration) of the transmission output gear 24. Constants a1, a2, b1, b2, c1, c2, d1, d2 are coefficients defined in design from the inertia in the rotating elements and the gear ratios ρ1, ρ2, ρ3 of the planetary gear devices 42, 44, 46 (specific numerical values differ depending on the shift patterns such as a power-on upshift, a power-off upshift, a power-on downshift, or a power-off downshift, gear positions between which the shift is performed, etc.).

$$\dot{\omega}intgt = a1 \cdot Tin + b1 \cdot Tcbapl + c1 \cdot Tcbdrn + d1 \cdot \dot{\omega}o \quad (1)$$

$$Totgt = a2 \cdot Tin + b2 \cdot Tcbapl + c2 \cdot Tcbdrn + d2 \cdot \dot{\omega}o \quad (2)$$

In the shift model using the motion equation composed of two Equations (1) and (2), three control operation amounts are uniquely obtained by giving a condition necessary for determining the control operation amounts to this motion equation, (it is noted that the output gear angular acceleration dωo/dt is calculated from the AT output rotation speed ωo, which is the detection value of the output rotation speed sensor 54). As described above, the shift model of this example uses the motion equation of the automatic transmission 22 including the shift target values and the control operation amounts and the condition necessary for determining the control operation amounts with the shift model to determine the control operation amounts achieving the shift target values.

To achieve the shift of the automatic transmission 22 using the shift model, the electronic control device 70 further includes a shift target value setting means, i.e., a shift target value setting portion 76, a condition setting means, i.e., a condition setting portion 78, and a control operation amount calculating means, i.e., a control operation amount calculating portion 80.

The shift target value setting portion 76 sets the target input shaft angular acceleration dωintgt/dt in transition state of the shift using, for example, a relationship (e.g. input shaft angular acceleration map) in which the input shaft angular acceleration dωin/dt is defined in advance such that the change in the AT input rotation speed ωin in an inertia phase satisfying both the suppression of a shift shock and the shift time. The shift target value setting portion 76 sets the target AT output torque Totgt in transition of the shift by using, for example, a relationship (transmission output torque change map) in which a form of changing the AT output torque To is defined in advance, based on the required drive torque Tdem calculated by the engine control portion 72 and an elapsed time from the start of the shift control.

The condition setting portion 78 sets a condition (also referred to as a constraint condition) necessary for determining the control operation amounts with the shift model. The constraint condition is, for example, a torque sharing ratio of a transmission torque assigned to the release-side engagement device and the engagement-side engagement device. The torque sharing ratio is the ratio of the transmission torque shared by each of both engagement devices with respect to the torque on the transmission input shaft 34 when a total of transmission torque (total transmission torque) to be assigned to the release-side engagement device and the engagement-side engagement device at the time of the shift of the automatic transmission 22 is converted into the torque on the transmission input shaft 34, for example. The form of changing the torque sharing ratio is defined in advance for each shift pattern or gear positions between which the shift is performed, for example. Alternatively, depending on a difference of the shift pattern, whether the torque phase is in progress in transition of the shift, whether the inertia phase is in progress in transition of the shift, etc., the AT input torque Tin can be prevented from changing from the value before the shift, the release-side clutch torque Tcbdrn can be set to zero, or the engagement-side clutch torque Tcbapl can be set to zero. Therefore, the constraint condition includes, for example, fixing the value of the release-side clutch torque Tcbdrn (e.g., setting the release-side clutch torque Tcbdrn to zero or setting the constant of the term of the release-side clutch torque Tcbdrn to zero in the motion equation), fixing the value of the engagement-side clutch torque Tcbapl, or fixing the value of the AT input torque Tin, etc.

The control operation amount calculating portion 80 calculates the AT input torque Tin, the release-side clutch torque Tcbdrn, and the engagement-side clutch torque Tcbapl as the control operation amounts in accordance with the shift model for determining the control operation amount achieving the shift target values (i.e., the target input shaft angular acceleration dωintgt/dt and the target AT output torque Totgt set by the shift target value setting portion 76). The control operation amount calculating portion 80 transmits the AT input torque Tin, the release-side clutch torque Tcbdrn, and the engagement-side clutch torque Tcbapl as the required values for performing the shift (referred to as a required AT input torque Tindem, a required release-side clutch torque Tcbdrndem, and a required engagement-side clutch torque Tcbapldem, respectively) to the engine control portion 72 and the shift control portion 74. The AT input torque Tin is synonymous with the engine torque Te (=Tin/t) when torque ratio t of the torque converter 20 is taken into consideration.

The engine control portion 72 outputs to the engine control device 32 the engine control command signal Se for acquiring the required AT input torque Tindem (synonymous with the required engine torque Tedem) transmitted from the control operation amount calculating portion 80. The shift control portion 74 outputs to the hydraulic control circuit 40 the hydraulic control command signal Sat for acquiring the required release-side clutch torque Tcbdrndem and the required engagement-side clutch torque Tcbapldem transmitted from the control operation amount calculating portion 80.

The shift control during a downshift performed during deceleration running associated with accelerator-off state will be described in detail. Particularly, the downshift to be described is a downshift requested through an operation of the shift lever 68 at the time of accelerator-off, a downshift performed in association with accelerator-off state when the sport mode is selected with the driving mode selecting switch 64, or a downshift performed in association with the brake-on Bon at the time of accelerator-off. When such a downshift is performed, it is considered that the driver is requesting a rapid increase of deceleration. Therefore, when performing such a downshift, the electronic control device 70 performs a so-called blipping downshift in which the shift is allowed to promptly proceed by performing an engine torque-up to raise the engine torque Te in a shift transition process.

Specifically, at the time of the blipping downshift, the electronic control device 70 performs the engine torque-up with the release-side engagement device released, thereby raising the AT input rotation speed ωin toward a synchronous rotation speed after the downshift (=ωo*gear ratio γaft after downshift), and subsequently engages the engagement-side engagement device when the AT input rotation speed ωin rises to a predefined rotation speed close to the synchronous rotation speed, or when the AT input rotation speed win reaches the synchronous rotation speed.

The condition setting portion 78 sets the constraint condition in the shift model such that the blipping downshift as described above is performed during the downshift performed during deceleration running associated with accelerator-off state. The constraint condition at the time of the blipping downshift is set to, for example, a condition under which only the release-side engagement device is engaged between the release-side engagement device and engagement-side engagement device (e.g., condition under which the term of the engagement-side clutch torque Tcbapl is set to zero in the motion equation) when the torque phase is in progress, or a condition under which the release-side engagement device is released (e.g., condition under which the term of the release-side clutch torque Tcbdrn is set to zero in the motion equation) when the inertia phase is in progress.

During the downshift performed during deceleration running associated with accelerator-off state, the shift target value setting portion 76 sets the target AT output torque Totgt in transition of the shift such that the torque is changed from the AT output torque To before downshift to the AT output torque To after downshift. The AT output torque To during deceleration running associated with accelerator-off is a negative torque (also referred to as a deceleration torque) acquired due to an engine brake torque from the engine 12 during the fuel cut control, for example. This deceleration torque is changed depending on the gear position of the automatic transmission 22, and is more increased at the gear position on the lower vehicle speed side (i.e., the AT output torque To is reduced within the range of zero or less).

Figure 6:
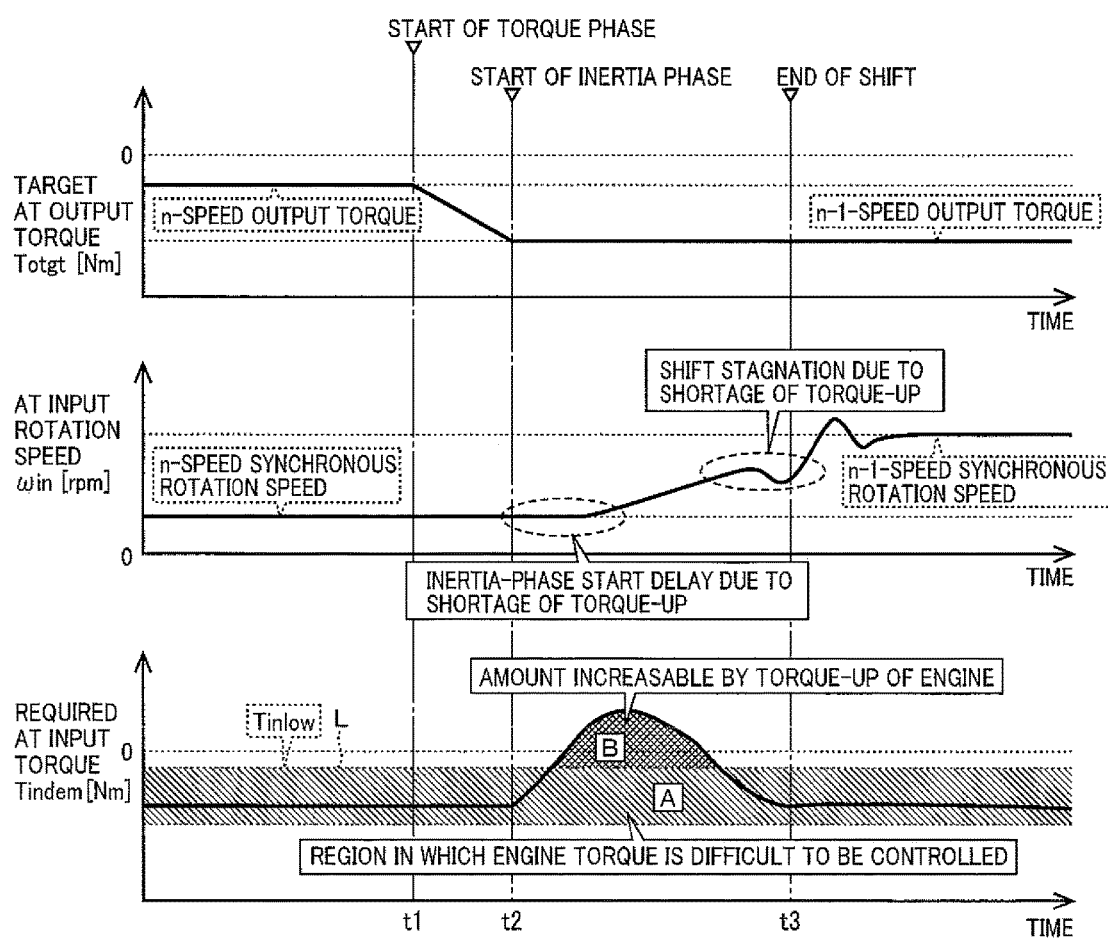
FIG. 6 is a time chart in the case of performing a blipping downshift and is a diagram of a comparative example different from this example.

FIG. 6 is a time chart in the case of performing the blipping downshift and is a diagram of a comparative example different from this example. In FIG. 6, a region A indicated by hatched lines in a chart of the required AT input torque Tindem is a region corresponding to the engine torque Te achieved by the engine 12 during the fuel cut control. In this region A, since the engine torque Te is passively determined due to a friction of the engine 12, a load of accessories such as an alternator, etc., this region A is a region in which the engine torque Te is difficult to be controlled. An upper limit boundary line L of this region A indicates the AT input torque Tin corresponding to a minimum torque of the engine torque Te in the engine 12 when the fuel cut control is canceled (also referred to as a minimum AT input torque Tinlow). This region of the minimum AT input torque Tinlow or more is a region in which the engine torque Te is controllable. In the shift model in the comparative example, the target AT output torque Totgt is changed during the torque phase such that the torque decreases from the AT output torque To before downshift (n-speed output torque) toward the AT output torque To after downshift (n−1-speed output torque). As a result of setting such a target AT output torque Totgt, the required AT input torque Tindem is set to a value within the region A until the start of the inertia phase and is raised after the start of the inertia phase from within the region A into the region of the minimum AT input torque Tinlow or more. In the region A, even if the required AT input torque Tindem is raised, the engine torque Te is the uncontrolled passive engine torque Te, and substantially no engine torque-up is performed. When the required AT input torque Tindem is made equal to or greater than the minimum AT input torque Tinlow, the fuel cut control is canceled and the engine torque-up becomes possible. Therefore, an increment of the engine torque Te (i.e., an engine torque-up amount) in a region B indicated by shading in the chart of the required AT input torque Tindem contributes as a torque amount allowing the downshift to proceed during the inertia phase. Therefore, the actual engine torque-up amount is insufficient with respect to the engine torque-up amount corresponding to the increment of the required AT input torque Tindem during the inertia phase. As a result, the progress of the downshift may stagnate due to a shortage of the engine torque-up amount. Additionally, since the required AT input torque Tindem is not made equal to or higher than the minimum AT input torque Tinlow immediately after the start of the inertia phase and the engine torque-up is not performed during this period, the start of the inertia phase may be delayed due to the shortage of the engine torque-up amount. It is conceivable that because of the stagnation of the progress of the downshift, the AT input rotation speed ωin is forcibly raised toward the synchronous rotation speed after downshift at the engagement-side engagement device regardless of the engagement-side clutch torque Tcbapl calculated by using the motion equations of Equations (1) and (2), for example. This may lead to a deterioration in shift feeling and an increase in shift shock.

Therefore, during the downshift performed during deceleration running associated with accelerator-off state (e.g., at the time of the blipping downshift), the shift target value setting portion 76 sets the target AT output torque Totgt in transition state of the shift such that the torque varies once directed in an increasing direction opposite to the direction of decreasing toward the AT output torque To at the completion of the downshift, in the process of changing the target AT output torque Totgt from the AT output torque To before downshift to the AT output torque To after downshift. In this case, the target AT output torque Totgt is increased toward a value larger than a value acquired by multiplying the minimum AT input torque Tinlow by the gear ratio γaft of the automatic transmission 22 after downshift (also referred to as a minimum AT output torque Tolow (=Tinlow*γaft)) so that the required AT input torque Tindem is made equal to or greater than the minimum AT input torque Tinlow. To prevent the shortage of the engine torque-up amount during the inertia phase, it is preferable to set the target AT output torque Totgt to a value larger than the minimum AT output torque Tolow before the start of the inertia phase, or to increase the target AT output torque Totgt from the AT output torque To before downshift to a value larger than the minimum AT output torque Tolow during the torque phase. Since the deceleration running is being performed, it is preferable to increase the target AT output torque Totgt in the range of zero or less, or to apply an upper limit guard to the target AT output torque Totgt at zero value, so as to prevent the feeling of deceleration from deteriorating. After the target AT output torque Totgt is maintained at a value larger than the minimum AT output torque Tolow, if the AT input rotation speed ωin approaches within a predetermined rotation speed to the synchronous rotation speed after downshift, the shift target value setting portion 76 reduces the target AT output torque Totgt toward the AT output torque To after downshift. The predetermined rotation speed is a predefined threshold value at which it can be determined that the AT input rotation speed ωin has approached the synchronous rotation speed after downshift to the extent that the target AT output torque Totgt no longer needs to be maintained at a value larger than the minimum AT output torque Tolow.

As described above, at the time of the blipping downshift, the shift target value setting portion 76 sets the target AT output torque Totgt such that after being increased from the AT output torque To before downshift within the range of zero or less, the torque Totgt is reduced toward the AT output torque To after downshift when the AT input rotation speed ωin approaches the synchronous rotation speed after downshift. The shift target value setting portion 76 increases the target AT output torque Totgt in a period from the start of the shift control to the start of the inertia phase in the downshift. The shift target value setting portion 76 increases the target AT output torque Totgt toward a value larger than the minimum AT output torque Tolow.

Figure 4:
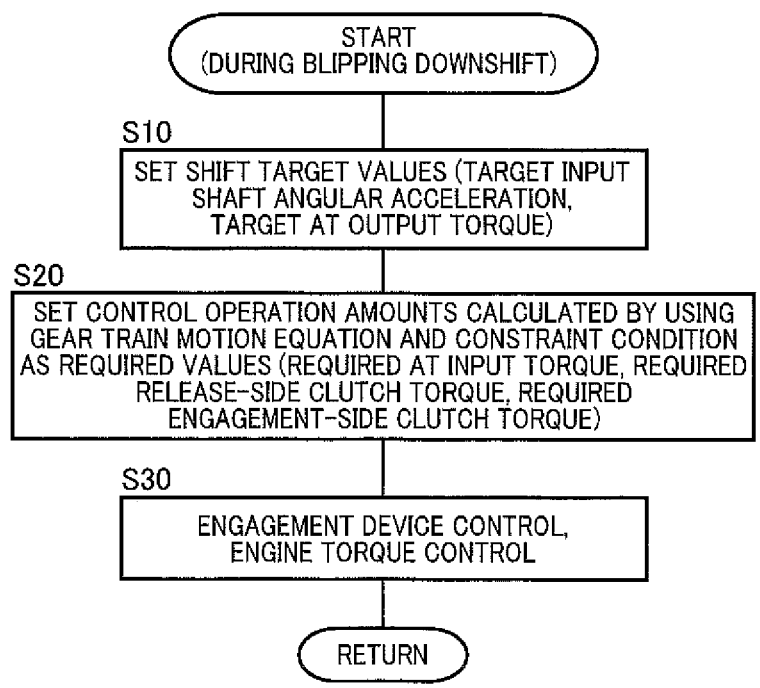
FIG. 4 is a flowchart for explaining a main portion of the control operation of an electronic control device, i.e., the control operation for suppressing the stagnation of the shift due to a shortage of an engine torque-up amount when a downshift is performed during deceleration running associated with accelerator-off by using a shift model.
Figure 5:
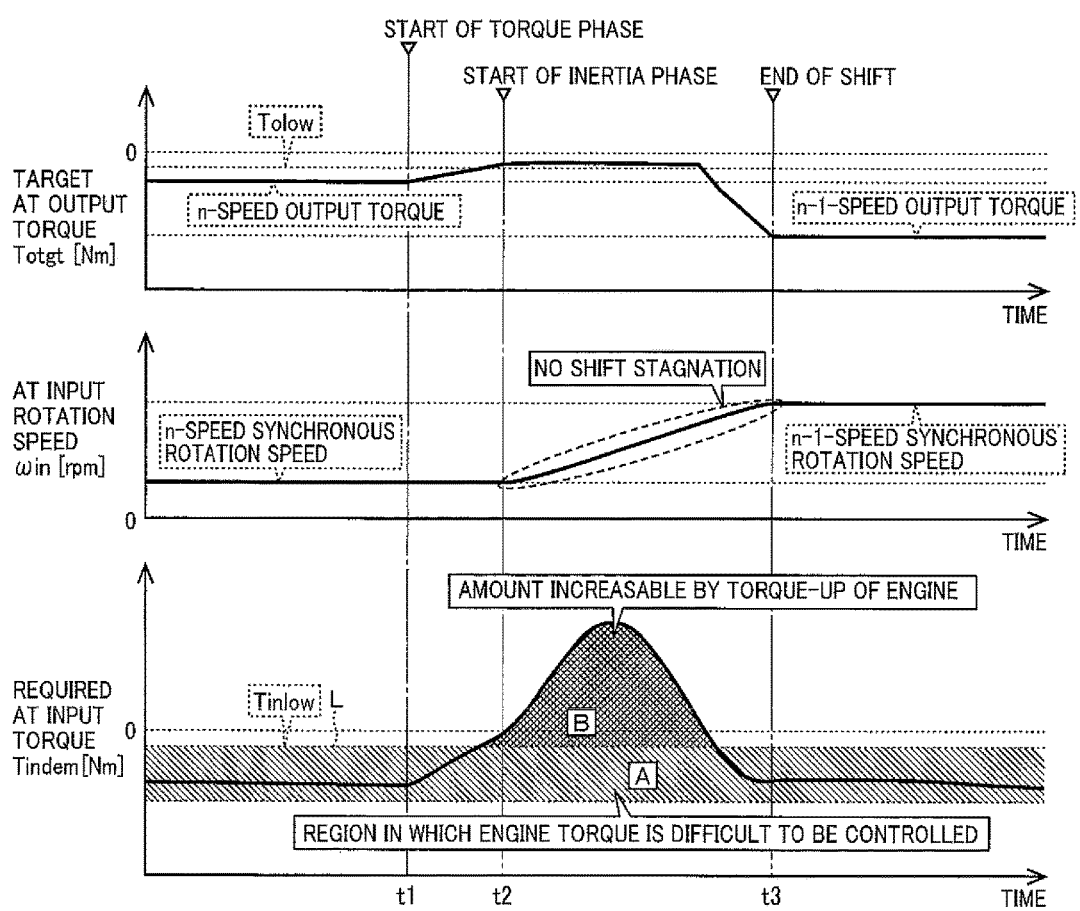
FIG. 5 is a diagram of an example of a time chart when the control operation shown in the flowchart of FIG. 4 is performed.

FIG. 4 is a flowchart for explaining a main portion of the control operation of the electronic control device 70, i.e., the control operation for suppressing the stagnation of the shift due to the shortage of the engine torque-up amount when a downshift is performed during deceleration running associated with accelerator-off by using the shift model and is repeatedly executed during the blipping downshift, for example. FIG. 5 is a diagram of an example of a time chart when the control operation shown in the flowchart of FIG. 4 is performed.

In FIG. 4, first, at step (hereinafter, step is omitted) S10 corresponding to the function of the shift target value setting portion 76, the shift target values (the target input shaft angular acceleration dωintgt/dt, the target AT output torque Totgt) are set. For example, the target AT output torque Totgt is set such that after being increased from the AT output torque To before downshift within the range of zero or less, the torque Totgt is reduced toward the AT output torque To after downshift when the AT input rotation speed ωin approaches the synchronous rotation speed after downshift. Subsequently, at S20 corresponding to the function of the control operation amount calculating portion 80, the control operation amounts achieving the shift target values set at S10 are calculated by using the motion equations of Equations (1) and (2) and the constraint condition, and the control operation amounts are set as required values (the required AT input torque Tindem, the required release-side clutch torque Tcbdrndem, the required engagement-side clutch torque Tcbapldem) for performing the shift. Subsequently, at S30 corresponding to the functions of the engine control portion 72 and the shift control portion 74, the engine control command signal Se for acquiring the required AT input torque Tindem (synonymous with the required engine torque Tedem) set at S20 is output to the engine control device 32, and the hydraulic control command signal Sat for acquiring the required release-side clutch torque Tcbdrndem and the required engagement-side clutch torque Tcbapldem set at S20 is output to the hydraulic control circuit 40.

In FIG. 5, as in FIG. 6, a region A indicated by hatched lines in a chart of the required AT input torque Tindem is a region corresponding to the engine torque Te during the fuel cut control. As in FIG. 6, an upper limit boundary line L of this region A indicates the minimum AT input torque Tinlow. In the shift model of this example, the target AT output torque Totgt is increased from the AT output torque To before downshift (n-speed output torque) to a value larger than the minimum AT output torque Tolow during the torque phase (see time t1 to time t2). The target AT output torque Totgt is maintained at a value larger than the minimum AT output torque Tolow until the AT input rotation speed ωin approaches the synchronous rotation speed after downshift (n−1-speed synchronous rotation speed), and is then reduced toward the AT output torque To after downshift (n−1-speed output torque) (see time t2 to time t3). By setting the target AT output torque Totgt in this way, the engine torque-up can be performed immediately after the start of the inertia phase. Therefore, the shortage of the engine torque-up amount can be avoided or suppressed in a region B indicated by shading in the chart of the required AT input torque Tindem with respect to the engine torque-up amount corresponding to the increment of the required AT input torque Tindem during the inertia phase. As a result, the progress of the downshift does not stagnate or is restrained from stagnating.

As described above, according to this example, during the downshift during deceleration running associated with accelerator-off state performed by using the shift model, the target AT output torque Totgt is set such that after being increased within the range of zero or less, the torque is reduced toward the AT output torque To after downshift and, therefore, the required engine torque Tedem is increased as the target AT output torque Totgt is once increased, so that an increment of the engine torque Te is easily ensured when the engine torque Te is raised with the release-side engagement device released. Thus, when the downshift during deceleration running associated with accelerator-off is performed by using the shift model, the shift can be restrained from stagnating due to the shortage of the increment of the engine torque Te. Since the target AT output torque Totgt is increased within the range of zero or less, the feeling of deceleration can be restrained from deteriorating.

According to this example, since the target AT output torque Totgt is increased in the period from the start of the shift control to the start of the inertia phase in the downshift, the increment of the engine torque Te in the inertia phase is easily ensured and the stagnation of the shift can appropriately be suppressed.

According to this example, since the target AT output torque Totgt is increased toward a value larger than the minimum AT output torque Tolow, the increment of the engine torque Te is more easily ensured when the engine torque Te is raised with the release-side engagement device released.

According to this example, since the control operation amounts are calculated according to the shift model for determining the control operation amounts achieving the shift target values by using the motion equation of the automatic transmission 22 and the constraint condition, the control operation amounts can appropriately be calculated when the downshift is performed during deceleration running associated with accelerator-off.

Although the example of the present invention has been described in detail with reference to the drawings, the present invention can be also applied in other forms.

For example, in the example described above, the M-operation position is one of the operation positions POSsh of the shift lever 68 and is a manual shift operation position enabling a manual shift for switching the gear position of the automatic transmission 22 according to an operation of the shift lever 68 by a driver; however, this form is not necessary. For example, the M-operation position may be a manual shift operation position at which a manual shift can be performed within a plurality of shift ranges which are different in their highest gear positions to be shifted in the automatic transmission 22. Alternatively, the vehicle 10 may further include a paddle switch (not shown) as a gear position switching operation member enabling a shift operation equivalent to the operation of the shift lever 68 to the upshift operation position "+" or the downshift operation position "−" at the M-operation position. The paddle switch may be mounted on a steering wheel and is provided with an upshift switch and a downshift switch. For example, the driver can operate the upshift switch and the downshift switch and the shift operation equivalent to that with the shift lever 68 can be performed, while the driver grips the steering wheel. Specifically, not only obviously when the shift lever 68 is operated to the M-operation position, but also even when the shift lever 68 is operated to the D-operation position, the operation of the upshift switch or the downshift switch leads to establishment of the manual shift mode and the gear position of the automatic transmission 22 is switched. When performing a downshift requested by operating the paddle switch during accelerator-off, the electronic control device 70 performs the blipping downshift. In the example described above, the vehicle may not necessarily be a vehicle in which the manual shift mode is established.

Although the power of the engine 12 is transmitted via the torque converter 20 to the automatic transmission 22 in the example described above, the present invention is not limited to this form. For example, another fluid transmission device such as a fluid coupling without a torque amplification effect may be used instead of the torque converter 20. Alternatively, this fluid transmission device may not necessarily be provided in the vehicle.

The above description is merely an embodiment and the present invention can be implemented in variously modified and improved forms based on the knowledge of those skilled in the art.

REFERENCE SIGNS LIST

10: Vehicle
12: Engine

14: Drive wheels
22: Automatic transmission (Multi-speed transmission)
24: Transmission output gear (Output rotating member of the multi-speed transmission)
34: Transmission input shaft (Input rotating member of the multi-speed transmission)
70: Electronic control device (Control device)
72: Engine control portion
76: Shift target value setting portion
78: Condition setting portion
80: Control operation amount calculating portion
CB: Engagement device (A plurality of engagement devices)

What is claimed is:

1. A control device of a vehicle including a multi-speed transmission having gear positions switched by executing release of a release-side engagement device out of a plurality of engagement devices and engagement of an engagement-side engagement device out of the plurality of engagement devices, and an engine of which a power is transmitted through the multi-speed transmission to drive wheels, the control device performing a shift of the multi-speed transmission by using a predefined shift model for determining control operation amounts of a torque at an input rotating member of the multi-speed transmission, a torque capacity of the release-side engagement device, and a torque capacity of the engagement-side engagement device, the control operation amounts achieving shift target values that are a target value of a torque at an output rotating member of the multi-speed transmission and a target value of angular acceleration of the input rotating member of the multi-speed transmission, the control device comprising:
a condition setting portion configured to set a condition necessary for determining the control operation amounts using the shift model such that during a downshift performed during deceleration running associated with accelerator-off state, an output torque of the engine is raised with the release-side engagement device released so as to increase a rotation speed of the input rotating member of the multi-speed transmission toward a synchronous rotation speed after the downshift and such that the engagement-side engagement device is then engaged; and
a shift target value setting portion configured to set the target value of the torque at the output rotating member of the multi-speed transmission during the downshift such that the torque at the output rotating member of the multi-speed transmission is increased from a value of the torque at the output rotating member before the downshift within a range of zero or less, and when a rotation speed of the input rotating member of the multi-speed transmission approaches the synchronous rotation speed after the downshift, the target value is reduced toward a torque at the output rotating member after the downshift.

2. The control device of a vehicle according to claim 1, wherein the shift target value setting portion increases the target value of the torque at the output rotating member of the multi-speed transmission in a period from a start of a shift control to a start of an inertia phase in the downshift.

3. The control device of a vehicle according to claim 1, further comprising an engine control portion configured to provide a fuel cut control of the engine during the deceleration running associated with the accelerator-off state, wherein
the shift target value setting portion increases the target value of the torque at the output rotating member of the multi-speed transmission toward a value larger than a value acquired by multiplying a torque at the input rotating member of the multi-speed transmission corresponding to a minimum torque of the output torque of the engine at the time of cancelation of the fuel cut control by a gear ratio of the multi-speed speed transmission after the downshift.

4. The control device of a vehicle according to claim 2, further comprising an engine control portion configured to provide a fuel cut control of the engine during the deceleration running associated with the accelerator-off state, wherein
the shift target value setting portion increases the target value of the torque at the output rotating member of the multi-speed transmission toward a value larger than a value acquired by multiplying a torque at the input rotating member of the multi-speed transmission corresponding to a minimum torque of the output torque of the engine at the time of cancelation of the fuel cut control by a gear ratio of the multi-speed speed transmission after the downshift.

5. The control device of a vehicle according to claim 1, further comprising a control operation amount calculating portion configured to calculate the control operation amounts in accordance with the shift model for determining the control operation amounts achieving the shift target values, by using a motion equation of the multi-speed transmission including the shift target values and the control operation amounts as well as the condition necessary for determining the control operation amounts with the shift model.

6. The control device of a vehicle according to claim 2, further comprising a control operation amount calculating portion configured to calculate the control operation amounts in accordance with the shift model for determining the control operation amounts achieving the shift target values, by using a motion equation of the multi-speed transmission including the shift target values and the control operation amounts as well as the condition necessary for determining the control operation amounts within the shift model.

7. The control device of a vehicle according to claim 3, further comprising a control operation amount calculating portion configured to calculate the control operation amounts in accordance with the shift model for determining the control operation amounts achieving the shift target values, by using a motion equation of the multi-speed transmission including the shift target values and the control operation amounts as well as the condition necessary for determining the control operation amounts within the shift model.

8. The control device of a vehicle according to claim 4, further comprising a control operation amount calculating portion configured to calculate the control operation amounts in accordance with the shift model for determining the control operation amounts achieving the shift target values, by using a motion equation of the multi-speed transmission including the shift target values and the control operation amounts as well as the condition necessary for determining the control operation amounts within the shift model.

9. A control device of a vehicle including a multi-speed transmission having gear positions switched by executing release of a release-side engagement device out of a plurality of engagement devices and engagement of an engagement-side engagement device out of the plurality of engagement devices, and an engine of which a power is transmitted through the multi-speed transmission to drive wheels, the control device performing a shift of the multi-speed transmission by using a predefined shift model for determining control operation amounts of a torque at an input rotating member of the multi-speed transmission, a torque capacity of the release-side engagement device, and a torque capacity of the engagement-side engagement device, the control operation amounts achieving shift target values that are a target value of a torque at an output rotating member of the multi-speed transmission and a target value of angular acceleration of the input rotating member of the multi-speed transmission, the control device comprising:

a processor programmed to:
set a condition necessary for determining the control operation amounts using the shift model such that during a downshift performed during deceleration running associated with accelerator-off state, an output torque of the engine is raised with the release-side engagement device released so as to increase a rotation speed of the input rotating member of the multi-speed transmission toward a synchronous rotation speed after the downshift and such that the engagement-side engagement device is then engaged; and
set the target value of the torque at the output rotating member of the multi-speed transmission during the downshift such that the torque at the output rotating member of the multi-speed transmission is increased from a value of the torque at the output rotating member before the downshift within a range of zero or less, and when a rotation speed of the input rotating member of the multi-speed transmission approaches the synchronous rotation speed after the downshift, the target value is reduced toward a torque at the output rotating member after the downshift.

10. The control device of a vehicle according to claim 9, wherein the processor increases the target value of the torque at the output rotating member of the multi-speed transmission in a period from a start of a shift control to a start of an inertia phase in the downshift.

11. The control device of a vehicle according to claim 9, wherein the processor is further programmed to:
execute a fuel cut control of the engine during the deceleration running associated with the accelerator-off state, and
increase the target value of the torque at the output rotating member of the multi-speed transmission toward a value larger than a value acquired by multiplying a torque at the input rotating member of the multi-speed transmission corresponding to a minimum torque of the output torque of the engine at the time of cancelation of the fuel cut control by a gear ratio of the multi-speed speed transmission after the downshift.

12. The control device of a vehicle according to claim 10, wherein the processor is further programmed to:
execute a fuel cut control of the engine during the deceleration running associated with the accelerator-off state, and
increase the target value of the torque at the output rotating member of the multi-speed transmission toward a value larger than a value acquired by multiplying a torque at the input rotating member of the multi-speed transmission corresponding to a minimum torque of the output torque of the engine at the time of cancelation of the fuel cut control by a gear ratio of the multi-speed speed transmission after the downshift.

13. The control device of a vehicle according to claim 9, wherein the processor is further programmed to:
calculate the control operation amounts in accordance with the shift model for determining the control operation amounts achieving the shift target values, by using a motion equation of the multi-speed transmission including the shift target values and the control operation amounts as well as the condition necessary for determining the control operation amounts with the shift model.

14. The control device of a vehicle according to claim 10, wherein the processor is further programmed to:
calculate the control operation amounts in accordance with the shift model for determining the control operation amounts achieving the shift target values, based on a motion equation of the multi-speed transmission including the shift target values and the control operation amounts as well as the condition necessary for determining the control operation amounts within the shift model.

15. The control device of a vehicle according to claim 11, wherein the processor is further programmed to:
calculate the control operation amounts in accordance with the shift model for determining the control operation amounts achieving the shift target values, based on a motion equation of the multi-speed transmission including the shift target values and the control operation amounts as well as the condition necessary for determining the control operation amounts within the shift model.

16. The control device of a vehicle according to claim 12, wherein the processor is further programmed to:
calculate the control operation amounts in accordance with the shift model for determining the control operation amounts achieving the shift target values, based on a motion equation of the multi-speed transmission including the shift target values and the control operation amounts as well as the condition necessary for determining the control operation amounts within the shift model.

* * * * *